Patented Aug. 1, 1950

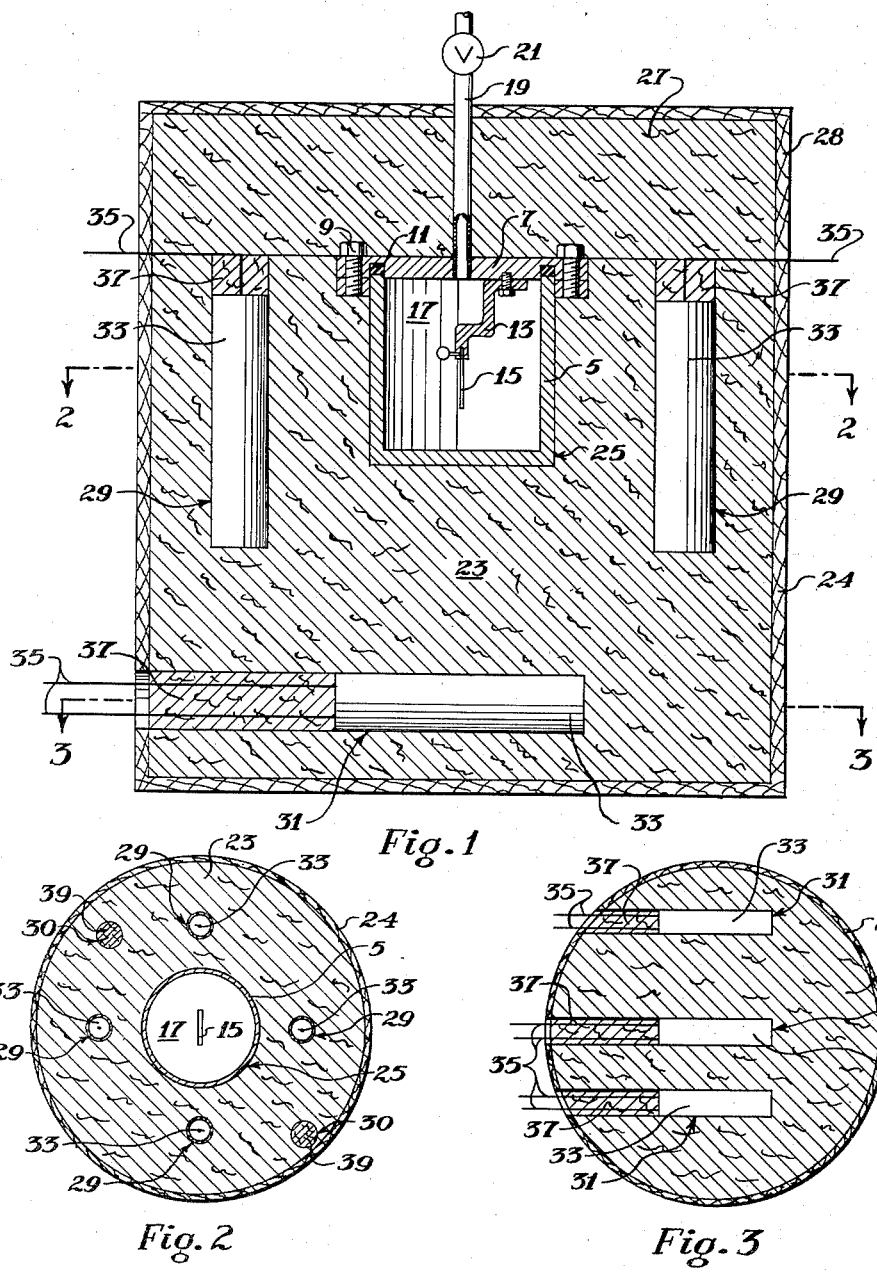

2,517,469

UNITED STATES PATENT OFFICE 2,517,469

METHOD AND APPARATUS FOR MEASURING ALPHA PARTICLE RADIATION

Richard W. Dodson, Pasadena, Calif., and William H. Beamer, Youngstown, Ohio, assignors to the United States of America as represented by the United States Atomic Energy Commission Application November 2, 1945, Serial No. 626,385

6 Claims. (Cl. 250—83.6)

The present invention relates to a method and apparatus for the detection and measurement of alpha particle radiation, and is particularly concerned with the detection and measurement of alpha particle emission from high intensity alpha particle sources.

There are various known methods and apparatus for detection and measuring the strength of alpha particle sources. These include photographic procedures, which may involve the use of a cloud chamber, procedures utilizing suitably prepared screens which fluoresce when subjected to alpha particle irradiation, and procedures which depend for their operation upon the use of ionization chambers, calorimeters, or devices known as de-multipliers. Certain deficiencies are inherent in all of these procedures and devices. The cloud chamber and fluorescence procedures are very time consuming and as a result, are unsuited for quantitative determinations where rapid radioactive decay or changes in intensity of the particle emission can be expected. The calorimetric method and apparatus, while one of the best procedures available for measuring the intensity of strong alpha particle sources, requires the use of delicate, highly sensitive instruments for measuring temperature and rather elaborate equipment for controlling heat transfer. The procedure, consequently, requires a considerable period of time and can be performed only by highly skilled persons. The calorimetric method is further objectionable in that it detects not only the emitted or useful alpha particles, but also those having paths confined entirely within the emitter. The de-multiplier procedure involves the measurement of the alpha particles emitted within a known small solid angle, the arrangement thereby substantially decreasing the number of particles reaching the detection apparatus as compared with the total number being emitted. When used for measuring a very strong source, the multiplier apparatus is necessarily quite bulky and very substantial errors may be introduced into the indicated results due to contamination. The ionization chamber type apparatus is, in general, quite satisfactory for the detection and measurement of alpha particle emission from low or medium intensity sources. However, when an effort is made to utilize apparatus of this type for the measurement of high intensity alpha particle sources, a number of very troublesome difficulties are encountered. The most serious of these is the necessity for employing extremely high voltages across the ionization chamber electrodes, and this results in frequent and highly objectionable voltage breakdowns. The high voltages are objectionable for the further reason that they render the apparatus dangerous to the operating personnel.

Accordingly, the principal object of the present invention is to provide an apparatus and method for detecting and measuring the alpha particle emission from high intensity alpha particle sources which shall be free from all of the objections of the known methods and devices. As will hereinafter appear, this object is accomplished by the provision of an improved apparatus and method wherein the alpha particle radiation which it is desired to detect and measure is converted by induced alpha-neutron nuclear reactions into neutron particle radiation, thereby making possible the use of neutron detection and measuring means for providing an indication or measurement which is indicative of the alpha particle activity of the source under test. It should be noted that this method is applicable to the comparison of the relative strength only of similar alpha emitting substances since the relationship between neutrons emitted from the alpha-neutron nuclear reactions and alpha particles causing such emission is dependent upon the energy of the alpha particles.

The features of one preferred embodiment of the invention are illustrated in the accompanying drawings wherein:

Figure 1 is a sectional view of an apparatus in accordance with the invention;

Figure 2 is a reduced scale, sectional view on the line 2—2 of Figure 1; and

Figure 3 is a reduced scale, sectional view on line 3—3 of Figure 1.

The particular embodiment in the invention illustrated in the drawing includes three main parts. These are: a means for supporting the alpha particle source within, or in proximity to, a medium which, upon being irradiated by alpha particles from the source, will emit neutrons; means for detecting and measuring, as by counting, the number of neutrons so emitted; and, since most neutron detection means are most responsive to neutrons at thermal energies, the apparatus also includes means for reducing to thermal energy, or "thermalizing," the neutrons emitted as a result of the alpha particle irradiation of the neutron emitting material.

The first of these parts, the support means, comprises, in the illustrative apparatus, a cup-shaped cylindrical closure 5, which is manufactured of aluminum, or an aluminum alloy or other neutron permeable material, and within which the alpha source to be examined is contained. The closure 5 is provided with a cover 7, which is adapted to be fastened in place by suitable, spaced bolts or cap screws 9, and the closure 5 and the cover 7 are provided with interfitting parts which cooperate with a gasket 11 to provide a gas tight seal when the cover is in place. A bracket 13 or other suitable means for supporting the alpha particle source, which will frequently comprise a flat piece of platinum foil or the like, is attached to the cover 7, as illustrated.

During use of the apparatus, the alpha particle source is desirably supported within the hermetically sealed chamber 17, provided by the closure 5 and the cooperating cover 7, in a central position, as illustrated at 15. The chamber 17 contains a material, conveniently a gas or a liquid, which has a high absorption cross section for alpha particles and which emits neutrons when subjected to alpha particle irradiation, by the alpha-neutron reaction. The material contained in the chamber 17 is employed both as a source of neutrons and as a barrier for preventing the alpha particles emitted from the alpha source from passing beyond the confines of the chamber 17 wherein the source is contained. Hence, the dimensions of the chamber 17 should be such that the probability of alpha particles passing out of the chamber without undergoing the alpha-neutron reaction is very small.

For convenience in introducing the neutron yielding, alpha particle barrier material into the source-containing chamber 17, the chamber cover 7 is provided with a tubular inlet 19 and a valve 21, as indicated. There are various alpha-neutron reactive materials which can be employed within the source-containing chamber 17. Fluorine-containing gases are however, particularly desirable, they are readily available, and they have a very high absorption cross section for alpha particles in the alpha neutron reaction. Examples of these fluorine-containing gases are sulphur hexa-fluoride, $SF_6$, carbon tetrafluoride, $CF_4$, hexafluorethane, $C_2F_6$, hydrogen fluoride, $HF$, simple fluorine gas, $F_2$, and silicon tetrafluoride, $SiF_4$. The gas is maintained at sufficient pressure to assure that all of the alpha particles emitted by the source under test will be absorbed within the confines of the chamber 17. When using the fluorine containing gases, pressures of the order of 10 atmospheres are usually satisfactory for most high intensity alpha particle sources.

The closure 5 and the cover 7 which define the walls of the chamber 17 within which the source is contained, are supported within a cylindrically shaped body 23 of neutron slowing material, such as paraffin or beryllium, of sufficient dimensions to effect the thermalization of substantially all of the neutrons resulting from the alpha-neutron reactions taking place in the chamber 17. In the particular embodiment illustrated in the drawings, the body 23 of neutron slowing material comprises a cast block of paraffin having the form of a right cylinder, about 3 feet in diameter and about 3 feet in height. The paraffin block 23 is enclosed within a wooden, tub-like, outer container 24, as shown. The closure 5 and its cap 7 are adapted to fit snugly within a suitable recess 25, provided centrally of the paraffin body 23. To assure efficient slowing of the neutrons and to minimize neutron losses, the device includes a cylindrical cover or shield 27, also of neutron slowing material which is of substantially the same diameter as the main body 23 of neutron slowing material and which may be split, if desired, for convenience in handling. The cover or shield 27 may likewise comprise a cast block of paraffin, and it is adapted to overlie the sample container as shown in Figure 1.

An outer protective cover 28, which may be of wood, is desirably provided for the shield 27. A series of cylindrically shaped cavities or passageways are provided in the main body 23 of neutron slowing material for receiving the neutron detection and measuring means. In the particular apparatus illustrated, the main body 23 of neutron slowing material is provided with four, equally spaced, vertically extending, elongated, cylindrical cavities 29 positioned along a circumference about half-way through the body of neutron slowing material, and with two diametrically spaced, vertically extending, elongated cavities 30 disposed somewhat nearer the outer periphery of the body of neutron slowing material. The apparatus also includes three, horizontally extending, elongated cavities 31, located near the bottom of the block of neutron slowing material, as illustrated.

During use of the apparatus, it is intended that a suitable neutron detection means, which may comprise a Geiger-Muller counter as illustrated at 33, or a piece of foil of a material which is rendered radioactive when subjected to neutron bombardment, shall be located in the cavities 29, 30, and 31, provided for the detection means. By spacing these cavities at different distances from the alpha source it is possible to obtain somewhat more accurate measurements of the induced neutron activity and hence a more accurate measurement of the alpha activity of the source under test.

It will be understood that substantially any of the known types of neutron detection means can be employed. The neutron-responsive Geiger-Muller counter, either of the type containing a gas such as boron trifluoride which is capable of absorbing neutrons with accompanying ionizing events such as a Geiger-Muller counter being generally known as a gas amplification proportional counter, or the Geiger-Muller counter of the type which contains a quantity of a solid material which is capable of producing an ionizing event when subjected to neutron irradiation, such as a foil of the 235 isotope of uranium, are particularly satisfactory, since these devices may be connected directly to known types of amplifiers and counting means. However, it is equally practicable to utilize foils of uranium, silver, or indium which become radioactive when subjected to neutron irradiation. The foil devices are somewhat less desirable in that they must be removed from the apparatus in order that the induced radioactivity can be measured and they are therefore incapable of providing continuous indications of the neutron activity resulting from the alpha emission of the alpha sources under test. Geiger-Muller counters are illustrated at 33 in the drawings, and the usual electrical connection from the counter electrodes to the associated apparatus are indicated at 35. Due to the fact that the various amplifying and counting circuits employed in conjunction with Geiger-Muller counters are well known and are not a part of this invention, these have not been shown in the drawings.

It is desirable to insert plugs of the neutron devices, as illustrated at 37, and when any of the cavities 29, 30, and 31 are not being used for containing neutron detection means, those passage ways should be plugged with a suitable cylindrical slug of neutron slowing material as indicated at 39 in Figure 2. When Geiger-Muller counters are used, it is convenient to make the plugs 37, of paraffin and to use those plugs as insulation for the counter leads 35, as illustrated particularly in Figure 3.

When it is desired to measure the intensity of an alpha source in accordance with the invention, the source will be supported within the chamber 17, as by fastening it to the bracket 13 attached to the chamber cover 7, and then bolting the cover in place. The interior of the chamber 17 will then be evacuated and the selected gas, under the desired pressure, will be introduced therein. The chamber 17 containing the alpha source and the alpha-neutron reactive gas may then be slipped into place in the cavity 25 provided in the main body 23 of neutron slowing material. Previously, suitable neutron detection means, which may comprise Geiger-Muller counter tubes or other devices as previously described, will have been placed in some or all of the cavities 29, 30, and 31, provided therefor, and the plugs 37 and 39 will have been inserted on top of the counting means or within the unoccupied cavities. The cover 27 may then be put in place and the apparatus is ready for use. Alpha particles emitted from the alpha source will react, nuclearly, with the gas contained within the chamber 17, in accordance with the well known alpha-neutron reaction, to effect the emission of neutrons, some of which may be at a substantial velocity. The number of the neutrons so emitted will be proportional to the number of alpha particles emitted by the alpha source. These neutrons, upon entering the body 23 of neutron-slowing material which surrounds the gas containing chamber 17 and the alpha source contained therein will be slowed to detectable energies, and will be detected and counted by the means provided. Either prior or subsequent to the measurement of the alpha source, the device may be calibrated by the use of sources of known intensity.

In use, the apparatus and method described above has proven highly effective for obtaining accurate measurements of the alpha activity and especially of the alpha activity of very strong alpha sources. The apparatus is free from the defects of the previously known means for accomplishing this purpose, and at the same time, it is relatively simple to operate. The features of the invention which are believed to be new, are expressly set forth in the accompanying claims.

What is claimed is:

1. In apparatus of the class described, a gas tight closure which contains a quantity of a gaseous material which will react with alpha particles to provide neutrons, means for supporting an alpha particle source within said closure, a body of neutron slowing material disposed about said closure, said body containing a plurality of cavities located at differing distances from said closure, and neutron detection means disposed within at least some of said cavities.

2. In apparatus of the class described, a gas tight closure which contains a quantity of a gaseous material which will react with alpha particles to provide neutrons, means for supporting an alpha particle source centrally within said gas containing closure, a body of neutron slowing material disposed about said closure, said body containing a plurality of cavities located at differing distances from said closure, and neutron detection means disposed within at least some of said cavities.

3. In apparatus of the class described, a gas tight closure which contains a quantity of a fluorine containing gas capable of reacting with alpha particles to provide neutron particles, means for supporting an alpha particle source within said closure, a body of hydrogenous neutron slowing material disposed about said closure, and neutron detection means disposed in cavities provided in said body of neutron slowing material.

4. In apparatus of the class described, a gas tight closure which contains a quantity of a fluorine containing gas capable of reacting with alpha particles to provide neutron particles, means for supporting an alpha particle source within said closure, a body of hydrogenous neutron slowing material disposed about said closure, said body containing a plurality of cavities located at differing distances from said closure, and neutron detection means disposed within at least some of said cavities.

5. In apparatus of the class described, a cylindrical, gas tight closure which contains a gaseous material capable of reacting with alpha particles to provide neutron particles, means for supporting an alpha particle source centrally within said closure, a cylindrical body of neutron slowing material disposed about said closure, said body containing a plurality of spaced apart, elongated, cavities located at differing distances from said closure, and neutron detection means disposed within at least some of said cavities.

6. In apparatus of the class described, a cylindrical, gas tight closure which contains a quantity of a fluorine containing gas capable of reacting with alpha particles to provide neutron particles, means for supporting an alpha particle source centrally within said closure, a cylindrical body of hydrogenous neutron slowing material disposed about said closure, said body containing a plurality of spaced apart, elongated, cavities located at differing distances from said closure, and neutron detection means disposed within at least some of said cavities.

RICHARD W. DODSON.
WILLIAM H. BEAMER.

REFERENCES CITED

The following references are of record in the file of this patent:

UNITED STATES PATENTS

| Number | Name | Date |
| --- | --- | --- |
| 2,206,634 | Fermi et al. | July 2, 1940 |
| 2,220,509 | Brons | Nov. 5, 1940 |

FOREIGN PATENTS

| Number | Country | Date |
| --- | --- | --- |
| 465,045 | Great Britain | Apr. 26, 1937 |